United States Patent
Li

(10) Patent No.: US 11,603,494 B2
(45) Date of Patent: Mar. 14, 2023

(54) GAS PHASE RUST-RESISTING MATERIAL FOR VARIOUS METALS AND PREPARATION METHOD THEREOF

(71) Applicant: SHANDONG DAYE CO., LTD., Shandong (CN)

(72) Inventor: Wenjun Li, Shandong (CN)

(73) Assignee: SHANDONG DAYE CO., LTD., Shandong (CN)

(*) Notice: Subject to any disclaimer, the term of this patent is extended or adjusted under 35 U.S.C. 154(b) by 313 days.

(21) Appl. No.: 16/488,829

(22) PCT Filed: Jun. 1, 2018

(86) PCT No.: PCT/CN2018/089668
§ 371 (c)(1),
(2) Date: Aug. 26, 2019

(87) PCT Pub. No.: WO2019/011077
PCT Pub. Date: Jan. 17, 2019

(65) Prior Publication Data
US 2020/0385633 A1    Dec. 10, 2020

(30) Foreign Application Priority Data

Jul. 13, 2017 (CN) .......................... 201710568693.8

(51) Int. Cl.
*C09K 15/30* (2006.01)
*C09K 15/02* (2006.01)
*C09K 15/18* (2006.01)
*C09K 15/20* (2006.01)
*C23F 11/02* (2006.01)

(52) U.S. Cl.
CPC .............. *C09K 15/30* (2013.01); *C09K 15/02* (2013.01); *C09K 15/18* (2013.01); *C09K 15/20* (2013.01); *C23F 11/02* (2013.01)

(58) Field of Classification Search
CPC ..................................................... C09K 15/02
See application file for complete search history.

(56) References Cited

FOREIGN PATENT DOCUMENTS

| CN | 102719302 A | * | 10/2012 |
| CN | 103387867 A | * | 11/2013 |
| CN | 106544676 A | * | 3/2017 |

OTHER PUBLICATIONS

English machine translation of CN-102719302-A (Year: 2012).*
English machine translation of CN-103387867-A (Year: 2013).*
English machine translation of CN-106544676-A (Year: 2017).*

* cited by examiner

*Primary Examiner* — Peter F Godenschwager

(57) ABSTRACT

A gas phase rust-resisting material for various metals includes, calculated in parts by weight, following components of: 78.5 to 95.5 parts of benzotriazole, 78.5 to 95.5 parts of dicycloethylamine nitrite, 500 to 800 parts of octadecylamine, 9000 to 11000 parts of ethanol, 33.5 to 38.5 parts of a reinforcing agent and 23.5 to 25.5 parts of a rust-resistant microcapsule. Further disclosed is a method for preparing the gas phase rust-resisting material which is suitable for various metals.

9 Claims, No Drawings

GAS PHASE RUST-RESISTING MATERIAL FOR VARIOUS METALS AND PREPARATION METHOD THEREOF

CROSS REFERENCE OF RELATED APPLICATION

This is a U.S. National Stage under 35 U.S.C 371 of the International Application PCT/CN2018/089668, filed Jun. 1, 2018, which claims priority under 35 U.S.C. 119(a-d) to CN 201710568693.8, titled Gas phase rust-resistant material for various metals and filed Jul. 13, 2017, wherein entire contents of CN 201710568693.8 are incorporated herein by reference.

BACKGROUND OF THE PRESENT INVENTION

Field of Invention

The present invention relates to a gas phase rust-resisting material and a preparation method thereof, in particular to a gas phase antirust material which can be utilized for various metals and a preparation method thereof.

Description of Related Arts

Metal parts are prone to rust during the process of production, processing and transportation, which requires the use of rust-resisting oil to form a film on the surface of the metal to prevent metal corrosion. The so-called rust is a mixture of oxides and hydroxides formed on the surface of the metal due to the action of oxygen and water. The rust of iron is red, the rust of copper is green, and the rust of aluminum and zinc is called white rust. It is difficult for the machine to be out of contact with oxygen, moisture or other corrosive media in the air during operation and storage. These materials will be electrochemically corroded and rusted on the surface of the metals. In order to prevent rust, the above substances must be prevented from contacting with the metals.

Soft film rust prevention is one of the most important ways to protect metal surface. Compared with other types of rust preventive oil, soft film has advantages of non-stick ash, clean and beautiful, easy to use, without needing to remove the oil film, and can be assembled with the film, and has a wide range of applications. However, since the existing soft film rust-resisting oil products tend to focus on a certain specific performance, the oil film is thin, easy to flow or dry and brittle, the comprehensive performance is not good, and the rust-resisting effect is poor in the case where the application environment is relatively complicated or bad. A Chinese patent with a publication number of CN102031189A discloses a soft film rust preventive oil, the composition of which is mainly: kerosene, eucalyptus oil and zinc naphthenate, and rust inhibitor of bismuth naphthalene sulfonate, etc., wherein the oil film is thin, the strength is low, the dropping point is low, it is easy to lose under the action of light. A Chinese patent with a publication number of CN201310333257.4 discloses a rust-resisting soft film composition and a preparation method thereof, and the vapor-phase corrosion inhibitor in the rust-protective soft film has self-volatility, and the rust-resisting film after drying and film formation can automatically volatilize rust-resisting gas. This rust-resisting gas can effectively prevent metal corrosion of damaged parts of rust-resisting film before self-repair or leak-coated parts, especially suitable for the inner surface of elements of leaking coating of inner cavity, pipe, groove, etc. However, the rust prevention time of the film is not long enough. Meanwhile, the mechanism is that when the rustproof film is damaged by extrusion, scratching, collision, erosion, etc. during use, the wall material of the microcapsule rust inhibitor will also be damaged. At this time, the rust-resisting agent in the microcapsule can automatically flow out and form a film, thereby imparting a self-repairing function to the rustproof soft film, which causes a result that if the rust prevention added has no damage or less damage, the effect will be discounted.

SUMMARY OF THE PRESENT INVENTION

In view of the deficiencies in the conventional art, a first object of the present invention is to provide a gas-phase rust-resisting material for various metals. By adding a gas-phase slow release material to the microcapsules, a gas-phase rust-resisting material capable of slowly releasing stored gas is manufactured. Meanwhile, a bareener is added to the solution, greatly improving adhesion of the rust-resisting material to the rust inhibitor under a thin oil film, in such a manner that dry cracking, brittleness and shedding is not easy to occur, thus red reducing the bad effect of rust-resisting caused by outdoor exposure, cold temperature and rust prevention, thereby improving the rust-resisting effect.

The microcapsules prepared by the process of the present invention have a suitable amount of titanium dioxide in the rust-resisting material, and the Titanium dioxide in an outdoor environment is affected by ultraviolet light and temperature, photoreaction occurs, microcapsules are broken, rust-preventing components are released, and rust-resisting capacity is further improved. Thus, the rust-resisting ability of the rust-resisting material can further greatly enhance the anti-resisting period of the outdoor storage material.

The microcapsules in the rust-resisting material prepared by the present invention have good oxidation resistance without contact with light, so long-term storage is possible under mild indoor conditions.

The present invention provides a gas-phase rust-resisting material for various metals, comprising: calculated by weight, 78.5 to 95.5 parts of benzotriazole, 78.5 to 95.5 parts of dicycloethylamine nitrite, 500 to 800 parts of octa-decylamine, 9000 to 11000 parts of ethanol, 33.5 to 38.5 parts of a reinforcing agent and 23.5 to 25.5 parts of a rust-resisting microcapsule.

Preferably, the reinforcing agent is a mixed solution of nan-graphene oxide dispersion and nano-silica dispersion.

Preferably, the nanometer graphene oxide dispersion is preferably produced from Shenzhen Turing Evolution Technology Co., Ltd. The nano-graphene oxide dispersion has a pH at a range of 5-7, a concentration of 5-8 mg/ml, a specific surface area of 1217 m$^2$/g, and a sheet diameter at a range of 2-4 μm; the nano silica dispersion is preferably produced from Nanjing Tianxing New Material Co., Ltd.; the nano-silica dispersion is an aqueous slurry; wherein the nano-silica dispersion has a silica content at a range of 18-20 wt % by weight, and a particle diameter D50 at a range of 50-80 nm, a pH at a range of 6-7, a viscosity at a range of 40-60 mpa·s, and a density at a range of 12-1.21 gml.

A second object of the present invention is to provide a method for preparing a gas phase rust-resisting material for various metals comprises steps of:

Step <1>: Preparing Rust-Resisting Microcapsules:

sub-step: (1) preparing a composite solution of nano-titanium dioxide and gelatin: preparing gelatin solution with a mass fraction of 12-18%, adding the nano-titanium dioxide with a mass fraction of 0.5-1.1%; at a rotation speed of 2000-2500 r/min, at a temperature of 65-70° C., performing high speed emulsification dispersion by a homogenizer for 20-30 min, so as to obtain a composite liquid of nano-titanium dioxide and gelatin;

sub-step (2) preparing a solution of modified casein: adding casein to distilled water and stirring into a paste, slowly adding NaoH solution with a concentration at a range of of 0.10-0.16 mol/L until the casein is completely dissolved; then boiling for 5-15 min; dissolving succinic anhydride in ethanol to prepare a succinic anhydride solution with a mass fraction at a range of 8-10%; dropping the succinic anhydride solution prepared into a casein solution until a pH is at a range of 7.2-8.0; and then at a temperature at a range of 48-55° C., stirring with a magnetic stirrer for 5-25 min, and then cooling to room temperature to prepare a modified casein solution;

(3) preparing a first capsule substrate, comprising: mixing benzotriazole, dicycloethylamine nitrite, octadecylamine and ethanol according to a proportion at a range of 1:1:7: 110-130 to prepare a rust-resisting core material, adding the composite liquid of nano-titanium dioxide and gelatin in the step (1) to the rust-resisting core material according to a certain proportion, stirring and mixing uniformly to form the first capsule substrate;

wherein a quality proportion of the composite liquid of nano-titanium dioxide and gelatin to the rust-resisting core material is at a range of 35-40%;

(4) preparing a second capsule substrate, adding chitosan and cellulose derivative to the modified casein solution prepared in the step (2), mixing, and performing ultrasonic dispersion to form the second capsule substrate;

wherein an ultrasonic frequency of the ultrasonic dispersion is at a range of 100-120 kHz; an ultrasonic power is at a range of 50-70 W; an ultrasonic time at an ultrasonic temperature is at a range of 15-20 min; an ultrasonic frequency is at a range of 2-3 times;

wherein a quality amount of the chitosan added is at a range of 3-5% of the modified casein solution; a quality amount of the cellulose derivative added is at a range of 5-6% of the modified casein solution; wherein the cellulose derivative is carboxymethylcellulose;

5) synthesizing rust-resisting microcapsule, comprising: mixing the second capsule substrate prepared in the step (4) and the first capsule substrate prepared in the step (3) according to a ratio of 2-3:1, adjusting pH to 5.0-5.5 with boric acid, continuing to stir for 25-45 min after an agglomeration reaction, wherein a rotation speed of the stirring is 450-600 r/min, waiting until the agglomeration reaction is completely finished, and then cooling a solution at a rate of 1° C. per minute until a temperature is within 10° C., adjusting pH to 8-9 with sodium hydroxide, stirring, and then standing until the rust-resisting microcapsules are separated out, filtering, washing to neutral, and drying to obtain rust-resisting microcapsules.

The rust-resisting microcapsule prepared by the above method is added to the preparation of the gas phase rust-resisting material, and in the process of utilizing the rust-resisting material, the rust-resisting material can be directly applied to the surface of the ferrous metal, or the rust-resisitng material and the substrate can manufacture composite rust-resisting paper. When the rust-resisting metal product is placed outdoors, besides the rust-resisting function of the rust-resisting material itself, the photo-reaction of titanium dioxide generates gas inside and breaks the microcapsule, and the rust-resisting material inside the microcapsule slow releases, therefore, controllability is available, which is capable of further extending the anti-resisting time of anti-resisting materials.

At the same time, the microcapsule prepared by the method has the characteristics of high embedding rate, large yield, moderate particle size, and has very good oxidation resistance, i.e., when the gas-phase rust-resisting material prepared by the present invention is applied indoors, the rust-resisting capsule can be kept closed for a long time, the rust-resisting material does not leak, and the rust-resisitng time is further prolonged.

The rust-resisting microcapsules prepared in the process of preparing the rust-resisting material of the present invention has an embedding rate at a range of 82-88%, a yield at a range of 65-77%, and an average particle diameter at a range of 12-16, with good oxidation resistance and storage stability, and an oxidation resistance thereof is greater than 0.742 mmol/g by ABTS method.

Step <2>: Mixing, Comprising:

mixing 78.5-95.5 parts of benzotriazole, 80.5-92.5 parts of dicyclohexylamine nitrite, 500-800 parts of octadecylamine, 9000-11000 parts of ethanol, 33.5-38.5 parts of reinforcing agent, 23.5-25.5 parts of rust-resisting microcapsules according to parts by mass of raw materials, stirring uniformly, heating to 80-90° C. and maintaining a temperature at 80-90° C. for 110-150 min, cooling to a room temperature to manufacture a vapor phase rust-resisting material of the present invention;

wherein the reinforcing agent is a mixed solution of nano-graphene oxide dispersion and nano-silica dispersion; wherein a volume ratio of nano-graphene oxide dispersion to the nano-silica dispersion is 1:5-7.

Based on the adoption of the above technical solutions, the technical effects achieved by the present invention are as follows.

1. The gas-phase rust-resisting material prepared by the invention can be used for rust prevention of various metals such as screw thread steel, wire rod, coil screw, round steel, wire rod and pipe material.

2. The gas phase rust-resisting material prepared by the present invention can basically meet the requirements of the current screw thread steel, and is particularly suitable for use in opencast, in the case of harsh weather and environment, the rust-resisting effect of the gas-phase rust-resisting material prepared by the present invention far exceeds that of similar products;

3. The embedding rate of the rust-resisting microcapsule prepared in the process of preparing the rust-resisting material of the present invention is at a range of 82-88%, and the yield is at a range of 65-77%; the average particle size is at a range of 12-16 µm, with good oxidation resistance and storage stability, and the oxidation resistance thereof detected by ABTS method is greater than 0.742 m mol/g 4. The gas-phase rust-resisting material prepared by the present invention can be applied to various metals, such as screw thread steel, wire, coiled screw, round steel, etc., especially suitable for screw thread steel; the gas-phase rust-resisting material prepared by the invention is applied to the screw thread steel HRB400, and the needle-like rust is detected firstly in the $52^{nd}$ day; on the screw thread steel HRB335, the needle-like rust is firstly detected on the $43^{rd}$ day. Applied to the screw thread steel HRB500, the needle-like rust firstly appeared on $46^{th}$ day; thus the gas-phase rust-resisting material prepared by the invention is suitable for applying in screw thread steel, especially for HRB400 screw thread steel.

5. The microcapsules prepared by the process of the present invention contain an appropriate amount of titanium dioxide. In an outdoor environment, the titanium oxide performs photo reaction by the influence of ultraviolet rays and temperature, the microcapsules are broken, and the rust-resisting components are released, thereby further improving the rust-resisting ability of the rust material, so that the rust-resisitng period of the outdoor storage material can be further prolonged.

6. The gas-phase rust-resisting material prepared by the invention is prepared by adding a gas-phase slow release material to the microcapsule to prepare a gas-phase rust-resisting material capable of slowly releasing the stored vapor-phase sustained release material, and has controllability 7. The invention adds a reinforcing agent in the process of preparing the gas phase anti-rust material, greatly improving adhesion of the rust-resisting material to the rust inhibitor under a thin oil film, in such a manner that dry cracking, brittleness and shedding is not easy to occur, thus red reducing the bad effect of rust-resisting caused by outdoor exposure, cold temperature and rust prevention, thereby improving the rust-resisting effect.

8. The microcapsules in the rust-resisting material prepared by the present invention have good oxidation resistance without contact with light, so long-term storage is possible under mild indoor conditions.

DETAILED DESCRIPTION OF THE PREFERRED EMBODIMENT

Further description of the present invention is illustrated combining with the preferred embodiments of the present invention.

Example 1

A method for preparing a gas phase rust-resisting material for various metals comprises steps of:

Step <1>: Preparing Rust-Resisting Microcapsules:

sub-step: (1) preparing a composite solution of nano-titanium dioxide and gelatin: preparing gelatin solution with a mass fraction of 13%, adding the nano-titanium dioxide with a mass fraction of 0.7%; at a rotation speed of 2000 r/min, at a temperature of 70° C., performing high speed emulsification dispersion by a homogenizer for 20 min, so as to obtain a composite liquid of nano-titanium dioxide and gelatin;

sub-step (2) preparing a solution of modified casein: adding casein to distilled water and stirring into a paste, slowly adding NaOH solution with a concentration of 0.16 mol/L until the casein is completely dissolved; then boiling for 10 min; dissolving succinic anhydride in ethanol to prepare a succinic anhydride solution with a mass fraction of 8%; dropping the succinic anhydride solution prepared into a casein solution until a pH is 7.5; and then at a temperature of 50° C., stirring with a magnetic stirrer for 15 min, and then cooling to room temperature to prepare a modified casein solution;

(3) preparing a first capsule substrate, comprising: mixing benzotriazole, dicycloethylamine nitrite, octadecylamine and ethanol according to a proportion of 1:1:7:120 to prepare a rust-resisting core material, adding the composite liquid of nano-titanium dioxide and gelatin in the step (1) to the rust-resisting core material according to a certain proportion, stirring and mixing uniformly to form the first capsule substrate;

wherein a quality proportion of the composite liquid of nano-titanium dioxide and gelatin to the rust-resisting core material is 40%;

(4) preparing a second capsule substrate, adding chitosan and cellulose derivative to the modified casein solution prepared in the step (2), mixing, and performing ultrasonic dispersion to form the second capsule substrate;

wherein an ultrasonic frequency of the ultrasonic dispersion is 100 kHz; an ultrasonic power is 70 W; an ultrasonic time at an ultrasonic temperature is 15 min; an ultrasonic frequency is 3 times;

wherein a quality amount of the chitosan added is 3% of the modified casein solution; a quality amount of the cellulose derivative added is 6% of the modified casein solution; wherein the cellulose derivative is carboxymethylcellulose;

5) synthesizing rust-resisting microcapsule, comprising: mixing the second capsule substrate prepared in the step (4) and the first capsule substrate prepared in the step (3) according to a ratio of 2:1, adjusting pH to 5.5 with boric acid, continuing to stir for 45 min after an agglomeration reaction, wherein a rotation speed of the stirring is 450 r/min, waiting until the agglomeration reaction is completely finished, and then cooling a solution at a rate of 1° C. per minute until a temperature is within 10° C., adjusting pH to 8 with sodium hydroxide, stirring, and then standing until the rust-resisting microcapsules are separated out, filtering, washing to neutral, and drying to obtain rust-resisting microcapsules.

The rust-resisting microcapsules prepared in the process of preparing the rust-resisting material of the present invention has an embedding rate of 88%, a yield of 77%, and an average particle diameter of 13 μm, with good oxidation resistance and storage stability, and an oxidation resistance thereof is 0.756 mmol/g by ABTS method.

Step <2>: Mixing, Comprising:

mixing 87.5 parts of benzotriazole, 87.5 parts of dicyclohexylamine nitrite, 700 parts of octadecylamine, 10500 parts of ethanol, 33.5 parts of reinforcing agent, 25.5 parts of rust-resisting microcapsules according to parts by mass of raw materials, stirring uniformly, heating to 90° C. and maintaining a temperature at 90° C. for 110 min, cooling to a room temperature to manufacture a vapor phase rust-resisting material of the present invention;

wherein the reinforcing agent is a mixed solution of nano-graphene oxide dispersion and nano-silica dispersion; wherein a volume ratio of nano-graphene oxide dispersion to the nano-silica dispersion is 1:6.

Example 2

A method for preparing a gas phase rust-resisting material for various metals comprises steps of:

Step <1>: Preparing Rust-Resisting Microcapsules:

sub-step: (1) preparing a composite solution of nano-titanium dioxide and gelatin: preparing gelatin solution with a mass fraction of 12%, adding the nano-titanium dioxide with a mass fraction of 0.5%; at a rotation speed of 2000 r/min, at a temperature of 65° C., performing high speed emulsification dispersion by a homogenizer for 30 min, so as to obtain a composite liquid of nano-titanium dioxide and gelatin;

(2) preparing a solution of modified casein: adding casein to distilled water and stirring into a paste, slowly adding NaoH solution with a concentration of 0.10 mol/L until the casein is completely dissolved; then boiling for 15 min; dissolving succinic anhydride in ethanol to prepare a succinic anhydride solution with a mass fraction of 8%; dropping the succinic anhydride solution prepared into a casein solution until a pH is 8.0; and then at a temperature of 48° C., stirring with a magnetic stirrer for 5 min, and then cooling to room temperature to prepare a modified casein solution;

(3) preparing a first capsule substrate, comprising: mixing benzotriazole, dicycloethylamine nitrite, octadecylamine and ethanol according to a proportion of 1:1:7:130 to prepare a rust-resisting core material, adding the composite liquid of nano-titanium dioxide and gelatin in the step (1) to the rust-resisting core material according to a certain proportion, stirring and mixing uniformly to form the first capsule substrate;

wherein a quality proportion of the composite liquid of nano-titanium dioxide and gelatin to the rust-resisting core material is 35%;

(4) preparing a second capsule substrate, adding chitosan and cellulose derivative to the modified casein solution prepared in the step (2), mixing, and performing ultrasonic dispersion to form the second capsule substrate;

wherein an ultrasonic frequency of the ultrasonic dispersion is 120 kHz; an ultrasonic power is 70 W; an ultrasonic time at an ultrasonic temperature is 16 min; an ultrasonic frequency is 2 times;

wherein a quality amount of the chitosan added is 3% of the modified casein solution; a quality amount of the cellulose derivative added is 5% of the modified casein solution; wherein the cellulose derivative is carboxymethylcellulose;

5) synthesizing rust-resisting microcapsule, comprising: mixing the second capsule substrate prepared in the step (4) and the first capsule substrate prepared in the step (3) according to a ratio of 3:1, adjusting pH to 5.0 with boric acid, continuing to stir for 25 min after an agglomeration reaction, wherein a rotation speed of the stirring is 450 r/min, waiting until the agglomeration reaction is completely finished, and then cooling a solution at a rate of 1° C. per minute until a temperature is within 10° C., adjusting pH to 8 with sodium hydroxide, stirring, and then standing until the rust-resisting microcapsules are separated out, filtering, washing to neutral, and drying to obtain rust-resisting microcapsules.

The rust-resisting microcapsules prepared in the process of preparing the rust-resisting material of the present invention has an embedding rate of 82%, a yield of 65%, and an average particle diameter of 16 μm, with good oxidation resistance and storage stability, and an oxidation resistance thereof is over 0.742 m mol/g by ABTS method.

Step <2>: Mixing, Comprising:

mixing 78.5 parts of benzotriazole, 80.5 parts of dicyclohexylamine nitrite, 500 parts of octadecylamine, 9000 parts of ethanol, 33.5 parts of reinforcing agent, 23.5 parts of rust-resisting microcapsules according to parts by mass of raw materials, stirring uniformly, heating to 90° C. and maintaining a temperature at 90° C. for 110 min, cooling to a room temperature to manufacture a vapor phase rust-resisting material of the present invention;

wherein the reinforcing agent is a mixed solution of nano-graphene oxide dispersion and nano silica dispersion;

wherein a volume ratio of nano-graphene oxide dispersion to the nano silica dispersion is 1:5.

Example 3

A method for preparing a gas phase rust-resisting material for various metals comprises steps of:

Step <1>: Preparing Rust-Resisting Microcapsules:

sub-step: (1) preparing a composite solution of nano-titanium dioxide and gelatin: preparing gelatin solution with a mass fraction of 18%, adding the nano-titanium dioxide with a mass fraction of 1.1%; at a rotation speed of 2500 r/min, at a temperature of 70° C., performing high speed emulsification dispersion by a homogenizer for 30 min, so as to obtain a composite liquid of nano-titanium dioxide and gelatin;

sub-step (2) preparing a solution of modified casein: adding casein to distilled water and stirring into a paste, slowly adding NaoH solution with a concentration of 0.16 mol/L until the casein is completely dissolved; then boiling for 15 min; dissolving succinic anhydride in ethanol to prepare a succinic anhydride solution with a mass fraction of 10%; dropping the succinic anhydride solution prepared into a casein solution until a pH is 8.0; and then at a temperature of 55° C., stirring with a magnetic stirrer for 25 min, and then cooling to room temperature to prepare a modified casein solution;

sub-step (3) preparing a first capsule substrate, comprising: mixing benzotriazole, dicycloethylamine nitrite, octadecylamine and ethanol according to a proportion of 1:1:8:120 to prepare a rust-resisting core material, adding the composite liquid of nano-titanium dioxide and gelatin in the step (1) to the rust-resisting core material according to a certain proportion, stirring and mixing uniformly to form the first capsule substrate;

wherein a quality proportion of the composite liquid of nano-titanium dioxide and gelatin to the rust-resisting core material is 40%;

sub-step (4) preparing a second capsule substrate, adding chitosan and cellulose derivative to the modified casein solution prepared in the step (2), mixing, and performing ultrasonic dispersion to form the second capsule substrate;

wherein an ultrasonic frequency of the ultrasonic dispersion is 120 kHz; an ultrasonic power is 70 W; an ultrasonic time at an ultrasonic temperature is 20 min; an ultrasonic frequency is 3 times;

wherein a quality amount of the chitosan added is 3% of the modified casein solution; a quality amount of the cellulose derivative added is 6% of the modified casein solution; wherein the cellulose derivative is carboxymethylcellulose;

sub-step (5) synthesizing rust-resisting microcapsule, comprising: mixing the second capsule substrate prepared in the step (4) and the first capsule substrate prepared in the step (3) according to a ratio of 3:1, adjusting pH to 5.5 with boric acid, continuing to stir for 45 min after an agglomeration reaction, wherein a rotation speed of the stirring is 600 r/min, waiting until the agglomeration reaction is completely finished, and then cooling a solution at a rate of 1° C. per minute until a temperature is within 10° C., adjusting pH to 9 with sodium hydroxide, stirring, and then standing until the rust-resisting microcapsules are separated out, filtering, washing to neutral, and drying to obtain rust-resisting microcapsules.

The rust-resisting microcapsules prepared in the process of preparing the rust-resisting material of the present invention has an embedding rate of 83%, a yield of 65%, and an average particle diameter of 15 μm, with good oxidation resistance and storage stability, and an oxidation resistance thereof is over 0.745 m mol/g by ABTS method.

Step <2>: Mixing, Comprising:

mixing 95.5 parts of benzotriazole, 92.5 parts of dicyclohexylamine nitrite, 800 parts of octadecylamine, 11000 parts of ethanol, 38.5 parts of reinforcing agent, 25.5 parts of rust-resisting microcapsules according to parts by mass of raw materials, stirring uniformly, heating to 90° C. and maintaining a temperature at 90° C. for 150 min, cooling to a room temperature to manufacture a vapor phase rust-resisting material of the present invention.

wherein the reinforcing agent is a mixed solution of nano-graphene oxide dispersion and nano silica dispersion;

wherein a volume ratio of nano-graphene oxide dispersion to the nano silica dispersion is 1:7.

Comparative Example

A method for preparing a gas phase rust-resisting material for various metals which changes the preparation method of the composite liquid of titanium oxide/gelatin compared with the preparation method of the Example 1, omits the addition of the reinforcing agent, and omits the modification of casein, wherein the specific method is:

Step <1>: Preparing Rust-Resisting Microcapsules:

Sub-Step: (1) Preparing a Composite Solution of Gelatin: preparing gelatin solution with a mass fraction of 13%, at a rotation speed of 2000 r/min, at a temperature of 70° C., performing high speed emulsification dispersion by a homogenizer for 20 min, so as to obtain a gelatin solution;

sub-step (2)) preparing casein solution:adding casein to distilled water and stirred into a paste, and slowly adding 0.16 mol/L of NaOH solution until the casein is completely dissolved, and adding ethanol to prepare a casein solution;

(3) preparing a first capsule substrate, comprising: mixing benzotriazole, dicycloethylamine nitrite, octadecylamine and ethanol according to a proportion of 1:1:7:120 to prepare a rust-resisting core material, adding the composite liquid of nano-titanium dioxide and gelatin in the step (1) to the rust-resisting core material according to a certain proportion, stirring and mixing uniformly to form the first capsule substrate;

wherein a quality proportion of the composite liquid of nano-titanium dioxide and gelatin to the rust-resisting core material is 40%;

(4) preparing a second capsule substrate, adding chitosan and cellulose derivative to the modified casein solution prepared in the step (2), mixing, and performing ultrasonic dispersion to form the second capsule substrate;

wherein an ultrasonic frequency of the ultrasonic dispersion is 100 kHz; an ultrasonic power is 70 W; an ultrasonic time at an ultrasonic temperature is 15 min; an ultrasonic frequency is 3 times;

wherein a quality amount of the chitosan added is 3% of the modified casein solution; a quality amount of the cellulose derivative added is 6% of the modified casein solution; wherein the cellulose derivative is carboxymethylcellulose;

(5) synthesizing rust-resisting microcapsule, comprising: mixing the second capsule substrate prepared in the step (4) and the first capsule substrate prepared in the step (3) according to a ratio of 2:1, adjusting pH to 5.5 with boric acid, continuing to stir for 45 min after an agglomeration reaction, wherein a rotation speed of the stirring is 450 r/min, waiting until the agglomeration reaction is completely finished, and then cooling a solution at a rate of 1° C. per minute until a temperature is within 10° C., adjusting pH to 8 with sodium hydroxide, stirring, and then standing until the rust-resisting microcapsules are separated out, filtering, washing to neutral, and drying to obtain rust-resisting microcapsules.

The rust-resisting microcapsules prepared in the process of preparing the rust-resisting material of the present invention has an embedding rate of 88%, a yield of 77%, and an average particle diameter of 13 μm, with good oxidation resistance and storage stability, and an oxidation resistance thereof is 0.756 mmol/g by ABTS method.

Step <2>: Mixing, Comprising:

mixing 87.5 parts of benzotriazole, 87.5 parts of dicyclohexylamine nitrite, 700 parts of octadecylamine, 10500 parts of ethanol, 25.5 parts of rust-resisting microcapsules according to parts by mass of raw materials, stirring uniformly, heating to 90° C. and maintaining a temperature at 90° C. for 110 min, cooling to a room temperature to manufacture a vapor phase rust-resisting material of the present invention.

The vapor phase corrosion inhibitor prepared by the present invention can be directly coated on the rust-resisting base paper or directly coated on a surface of a metal product; in order to further test a rust-resisting effect of the gas-phase rust-resisting material prepared by the present invention, tests are carried out as follows.

The gas phase rust-resisting material prepared by the present invention is separately coated to a surface of the surface-treated rebar HRB400, HRB335 and HRB500 to test rust-resisting performance thereof, Test 1 and Test 2 are performed, see Table 1 and Table 2 for details.

Test 1: Salt Spray Test

YW-1804 airflow salt spray test cabinet are adopted for neutral salt spray test. A corrosive medium is NaCl solution with a concentration of 8%, wherein pH=6.5-7.5; wherein temperature inside the salt spray cabinet is controlled at a range of (35±1) ° C., a relative humidity is about 98, the sample has an included angle of 30° with a perpendicular direction. After continuous spraying for 1 h, the spraying is stopped, and the sample is continuously placed in a salt spray cabinet for 1 hour or more for one cycle, and a rust trace of the sample is observed every other cycle to determine the corrosion resistance of a coating layer of the rust inhibitor.

A blank test group is a test group without utilizing any rust inhibitor.

TABLE 1

Neutral salt spray resistance of different types of screw thread steel after dip coating of the gas-phase rust-resisting materials prepared by the present invention

| | Type | | | | | | | | |
|---|---|---|---|---|---|---|---|---|---|
| | HRB400 | | | HRB335 | | | HRB500 | | |
| | Time (d) | | | | | | | | |
| | 0-20 | 21-80 | 41-80 | 0-20 | 21-80 | 41-80 | 0-20 | 21-80 | 41-80 |
| Example 1 | No rust mark. | No rust mark. | Needle-like rust mark appears on 58$^{th}$ day. | No rust mark. | No rust mark. | Needle-like rust mark appears on 45$^{th}$ day. | No rust mark. | No rust mark. | Needle-like rust mark appears on 49$^{th}$ day. |

TABLE 1-continued

Neutral salt spray resistance of different types of screw thread steel after dip coating of the gas-phase rust-resisting materials prepared by the present invention

| | Type | | | | | | | | |
|---|---|---|---|---|---|---|---|---|---|
| | HRB400 | | | HRB335 | | | HRB500 | | |
| | Time (d) | | | | | | | | |
| | 0-20 | 21-80 | 41-80 | 0-20 | 21-80 | 41-80 | 0-20 | 21-80 | 41-80 |
| Example 2 | No rust mark. | No rust mark. | Needle-like rust mark appears on $52^{nd}$ day. | No rust mark. | No rust mark. | Needle-like rust mark appears on $44^{th}$ day. | No rust mark. | No rust mark. | Needle-like rust mark appears on $46^{th}$ day. |
| Example 3 | No rust mark. | No rust mark. | Needle-like rust mark appears on $55^{th}$ day. | No rust mark. | No rust mark. | Needle-like rust mark appears on $43^{th}$ day. | No rust mark. | No rust mark. | Needle-like rust mark appears on $47^{th}$ day. |
| Comparative Example | No rust mark. | Needle-like rust mark appears on $22^{nd}$ day. | Dot rust mark appears on $52^{nd}$ day. | No rust mark. | Needle-like rust mark appears on $26^{nd}$ day. | Dot rust mark appears on $46^{th}$ day. | No rust mark. | Needle-like rust mark appears on $31^{st}$ day. | Dot rust mark appears on $42^{nd}$ day. |
| Blank Test | All red rust marks on $2^{nd}$ day. | All red rust marks. | All red rust marks on $2^{nd}$ day. | All red rust marks on $2^{nd}$ day. | All red rust marks. | All red rust marks. | All red rust marks on $2^{nd}$ day | All red rust marks. | All red rust marks. |
| Conventional rust inhibitor | Needle-like rust mark appears on $20^{th}$ day. | Needle-like rust mark appears on $26^{th}$ day. | All red rust marks on $53^{rd}$ day. | Needle-like rust mark appears on $18^{th}$ day. | Needle-like rust mark appears on $28^{th}$ day. | All red rust marks on $50^{th}$ day. | Needle-like rust mark appears on $16^{th}$ day. | Needle-like rust mark appears on $23^{nd}$ day. | All red rust marks on $52^{nd}$ day. |

It can be seen from the above Table that the gas-phase rust-resisting materials prepared by the present invention are respectively coated on screw thread steel HRB335, HRB400 and HRB500 with a cleanly treated surface. It can be concluded from the above Table that the gas-phase rust-resisting material prepared by the present invention is applied to the screw thread steel HRB400, and the needle-like rust mark first appears on a $52^{nd}$ day; on the HRB335, the needle-like rust mark first appears on a $43^{rd}$ day; and on the HRB500, the needle-like rust mark first appears on a $46^{th}$ day. Thus, the gas-phase rust-preventing material prepared by the invention is suitable for the screw thread steel, especially for the HRB400 thread Meanwhile, it can be seen from the conclusions of Table 1 that the vapor-phase rust-resisting material prepared in Examples 1-3 of the present invention is applied to the IRB400 screw thread steel, and on the $58^{th}$ day, the needle-like rust mark appears on the vapor-phase rust-resisting material prepared in the Example 1; on the $52^{nd}$ day, the needle-like rust mark appears on the vapor-phase rust-resisting material prepared in the Example 2; and on the $5^{th}$ day, the needle-like rust mark appears on the vapor-phase rust-resisting material prepared in the Example 3. Therefore, Example 1 is best mode of the present invention.

Test 2: Exposure Test

The gas-phase rust-resisting material prepared by the invention is respectively coated to the cleanly treated surface of the screw thread steel of HRB400, HRB35 and HRB500. In an outdoor environment from March to June, observe the rust-resisting performance of the sample. A specific observation results are shown in the Table 2.

TABLE 2

| | Types HRB400 Time (d) | | | |
|---|---|---|---|---|
| | 0-20 days | 21-40 days | 41-80 days | 81-150 days |
| Example 1 | No rust mark. | No rust mark. | No rust mark. | Needle-like rust mark appears on $138^{th}$ day. |
| Example 2 | No rust mark. | No rust mark. | No rust mark. | Needle-like rust mark appears on $115^{th}$ day. |
| Example 3 | No rust mark. | No rust mark. | No rust mark. | Needle-like rust mark appears on $128^{th}$ day. |
| Example 4 | No rust mark. | No rust mark. | No rust mark. | Needle-like rust mark appears on $96^{th}$ day. |
| Blank Test Group | Dot rust mark appears on $4^{th}$ day. | All red rust marks. | All red rust marks on the $25^{th}$ day. | All red rust marks. |
| Conventional Rust Inhibitor | No rust mark. | All red rust marks. | All red rust marks on the $38^{th}$ day. | All red rust marks on the $77^{th}$ day. |

From the results observed in Table 2, it can be concluded that the gas-phase rust resisting material prepared by the present invention can basically satisfy application of the current screw thread steel, especially suitable for the prevention of gas-phase rust-resisting materials prepared by the present invention in the open air and in a harsh environment. The rust-resisting effect of the present invention is far superior to similar products.

The gas-phase rust-resisting material prepared by the present invention can be used for stock rust prevention of screw thread steel, wire rod, coil screw, round steel, wire rod and pipe material, and can be used for rust prevention of various metals.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A gas-phase rust-resisting material for various metals, comprising: calculated by weight, 78.5 to 95.5 parts of benzotriazole, 78.5 to 95.5 parts of dicyclohexylamine nitrite, 500 to 800 parts of octadecylamine, 9000 to 11000 parts of ethanol, 33.5 to 38.5 parts of a reinforcing agent and 23.5 to 25.5 parts of a rust-resisting microcapsule.

2. The gas-phase rust-resisting material for various metals according to claim 1, wherein the reinforcing agent is a mixed solution of nano-graphene oxide dispersion and nano-silica dispersion; wherein a volume ratio of nano-graphene oxide dispersion to the nano-silica dispersion is in a range of 1:5-7.

3. The gas-phase rust-resisting material for various metals according to claim 2, wherein the nano-graphene oxide dispersion has a pH in a range of 5-7, a concentration of 5-8 mg/ml, a specific surface area of 1217 $m^2$/g, and a sheet diameter in a range of 2-4 μm; the nano-silica dispersion is an aqueous slurry;

wherein the nano-silica dispersion has a silica content in a range of 18-20 wt % by weight, and a particle diameter D50 in a range of 50-80 nm, a pH in a range of 6-7, a viscosity in a range of 40-60 mpa·s, and a density in a range of 1.2-1.21 gml.

4. A method for preparing the gas-phase rust-resisting material for the various metals according to claim 1, comprising a step of preparing rust-resisting microcapsules and a step of mixing; wherein the step of mixing comprises: mixing 78.5-95.5 parts of benzotriazole, 80.5-92.5 parts of dicyclohexylamine nitrite, 500-800 parts of octadecylamine, 9000-11000 parts of ethanol, 33.5-38.5 parts of reinforcing agent, 23.5-25.5 parts of rust-resisting microcapsules according to parts by mass of raw materials, stirring uniformly, then heating to a temperature in a range of 80-90° C. and maintaining the temperature for 110-150 min, cooling to a room temperature.

5. The method for preparing the gas-phase rust-resisting material for the various metals according to claim 4, wherein the step of preparing rust-resisting microcapsules comprises: (1) a sub-step of preparing a composite solution of nano-titanium dioxide and gelatin; (2) a sub-step of preparing a solution of modified casein; a sub-step (3) of preparing a first capsule substrate; a sub-step (4) preparing a second capsule substrate; and a sub-step (5) of synthesizing rust-resisting microcapsule.

6. The method for preparing the gas-phase rust-resisting material for the various metals according to claim 5, wherein the sub-step of preparing the composite solution of the nano-titanium dioxide and gelatin comprises preparing gelatin solution, adding the nano-titanium dioxide with a mass fraction of 0.5-1.1%; at a rotation speed in a range of 2000-2500 r/min, at a temperature in a range of 65-70° C., performing high speed emulsification dispersion by a homogenizer for 20-30 min.

7. The method for preparing the gas-phase rust-resisting material for the various metals according to claim 5, wherein sub-step (2) of preparing the solution of the modified casein comprises: adding casein to distilled water and stirring into a paste, adding NaOH solution with a concentration in a range of 0.10-0.16 mol/L until the casein is completely dissolved; then boiling for 5-15 min;

dissolving succinic anhydride in ethanol to prepare a succinic anhydride solution with a mass fraction in a range of 8-10%; dropping the succinic anhydride solution prepared into a casein solution until a pH is in a range of 7.2-8.0; and then at a temperature in a range of 48-55° C., stirring with a magnetic stirrer for 5-25 min, and then cooling to a room temperature.

8. The method for preparing the gas-phase rust-resisting material for the various metals according to claim 5, wherein sub-step (3) of preparing a first capsule substrate, comprises: mixing benzotriazole, dicyclohexylamine nitrite, octadecylamine and ethanol according to a proportion of 1:1:7:110-130 to prepare a rust-resisting core material, adding the composite liquid of nano-titanium dioxide and gelatin in the step (1) to the rust-resisting core material according to a certain proportion, stirring and mixing uniformly; wherein a proportion of the composite liquid of nano-titanium dioxide and gelatin to the rust-resisting core material is in a range of 35-40%.

9. The method for preparing the gas-phase rust-resisting material for the various metals according to claim 5, wherein the sub-step (4) preparing the second capsule substrate comprises: adding chitosan and cellulose derivative to the modified casein solution prepared in the step (2), mixing, and performing ultrasonic dispersion to form the second capsule substrate;

wherein an ultrasonic frequency of the ultrasonic dispersion is in a range of 100-120 kHz; an ultrasonic power is in a range of 50-70 W; an ultrasonic time at an ultrasonic temperature is in a range of 15-20 min; and an ultrasonic frequency is 3 times;

wherein an amount of the chitosan added is in a range of 3-5% of the modified casein solution; an amount of the cellulose derivative added is in a range of 5-6% of the modified casein solution; wherein the cellulose derivative is at least one member selected from the group consisting of carboxymethylcellulose; ethyl cellulose, hydroxyethyl cellulose and cyanoethyl cellulose.

* * * * *